United States Patent [19]

Rando et al.

[11] Patent Number: 4,698,479
[45] Date of Patent: Oct. 6, 1987

[54] BEAM DELIVERY SYSTEM FOR A $CO_2$ LASER

[75] Inventors: Joseph F. Rando, Los Altos Hills; Henry W. Jones, San Leandro, both of Calif.

[73] Assignee: Spectra-Physics, Inc., San Jose, Calif.

[21] Appl. No.: 925,503

[22] Filed: Oct. 30, 1986

Related U.S. Application Data

[63] Continuation of Ser. No. 577,343, Feb. 6, 1984, abandoned.

[51] Int. Cl.$^4$ .............................................. B23K 26/00
[52] U.S. Cl. ...................... 219/121 LV; 219/121 LC; 219/121 LU; 901/42
[58] Field of Search ................. 219/121 LU, 121 LV, 219/121 LW, 121 LX, 121 LC, 121 LZ, 121 LQ; 901/40, 42, 45, 6, 7

[56] References Cited

U.S. PATENT DOCUMENTS

| 4,174,154 | 11/1979 | Kawasaki | 219/121 LX |
| 4,287,459 | 9/1981 | Dahlström | 901/7 X |
| 4,350,379 | 9/1982 | Peroutky | 901/40 X |
| 4,542,278 | 9/1985 | Taylor | 219/121 LV |
| 4,623,229 | 11/1986 | Galan | 219/121 LV |

FOREIGN PATENT DOCUMENTS

| 1127550 | 9/1977 | German Democratic Rep. | 219/121 LQ |
| 55-73003 | 6/1980 | Japan | 350/548 |
| 58-6786 | 1/1983 | Japan | 219/121 LQ |
| 59-133143 | 2/1984 | Japan | 219/121 LQ |
| 2120202 | 11/1983 | United Kingdom | 219/121 LG |
| 2134071 | 8/1984 | United Kingdom | 219/121 LG |
| 894666 | 12/1981 | U.S.S.R. | 901/40 |

OTHER PUBLICATIONS

LF Staff Report, "Applications in Automaking", Laser Focus, Feb. 1975, pp. 11-12.

Yessik et al., "Laser Processing at Ford", Metal Progress, May 1975, pp. 210-215.

Vasilash, "At Coherent; Advanced Lasers and New Ideas in Robotics", Manufacturing Engineer, Mar. 1981, pp. 84-85.

Primary Examiner—M. H. Paschall
Attorney, Agent, or Firm—Donald C. Feix; Paul Davis; T. M. Freiburger

[57] ABSTRACT

A beam delivery system for delivering a laser beam from a stationary laser to a point in space under robot control has a universal or spherical shoulder joint which is free to rotate in any direction, a wrist joint which receives the beam from the shoulder joint and which allows the beam to be pointed in the required direction and a sectin of sliding tubes which couple the wrist joint directly to the shoulder joint in a straight line. The beam delivery system is constructed to be readily and effectively associated with a robot. The beam delivery system is mounted with the spherical or universal shoulder joint close to the vertical axis of the robot shoulder and with the spherical shoulder joint below the articulated arm mechanism of the robot so that the beam delivery system accesses a maximum volume beneath the articulated mechanism of the robot. The beam delivery system utilizes a minimum of internal mirrors to minimize power loss in the beam. The mirrors are close coupled and precision mounted in both the shoulder joint and the wrist joint to enable the beam to be transmitted in a long throw from the shoulder joint to the wrist joint through the telescoping tubes by a mechanism which minimizes the effect of inertial forces on the beam delivery system. The mirrors in the joints are front mounted and those in the shoulder joint may be adjustable so the mirrors can be easily positioned during initial set up and can also be readjusted or replaced, if necessary, during operation without the necessity to recalibrate the beam delivery system.

11 Claims, 20 Drawing Figures

BEAM DELIVERY SYSTEM FOR A CO$_2$ LASER

This is a continuation of co-pending application Serial No. 577,343 filed on Feb. 6, 1984 now abandoned.

BACKGROUND OF THE INVENTION

This invention relates to a beam delivery system. It relates particularly to a laser beam delivery system for delivering a relatively high power laser beam from a stationary laser to a movable point in space at a work station and under the control of a robot.

Relatively high power lasers are commonly used in industrial operations for operations such as cutting and welding. A number of cutting or welding operations may be required at different locations on an assembly line, and robots are coming into increasing use for accomplishing such varied but repetitive work station operations. The robots usually are mounted on a fixed base and have a shoulder joint, a wrist joint and an articulated arm mechanism which extends between the shoulder joint and the wrist joint and which includes an elbow joint.

Prior art beam delivery systems constructed for use with such robots have included a beam guide mechanism which mounts the beam delivery system on each joint of the robot. These prior art beam delivery systems have, in effect, used the joints of the robot as the path to convey the beam. These prior art beam delivery systems are not very flexible if it is desired to change robots. These prior art beam delivery systems also required a large number of mirrors. Each mirror in the system introduces a small but significant amount of power loss.

Prior art beam delivery systems which utilized articulated beam guide tubes also introduced problems of random inertial forces. When the tubes are moved quickly from one location to the other and accelerations are produced by such quick movements, the inertial forces produced in such articulated tube systems have caused problems of time delays in obtaining final positioning of the tubes.

SUMMARY OF THE PRESENT INVENTION

It is a primary object of the present invention to avoid and to overcome the problems of prior art beam delivery systems.

It is another primary object of the present invention to construct a flexible beam delivery system patterned after a spherical coordinate system where a point in three dimensions is specified by two angles and a radius.

A high power laser beam delivery system of the present invention is conducted through sealed joints and tubes and incorporates basically three subsystems—a spherical joint which is free to rotate in any direction, a wrist joint which allows the beam at the end of the beam delivery system to be pointed in the required direction, and a section of telescoping tubes which interconnect the spherical joint and the wrist joint directly and in a straight line without intermediate joints or mirrors.

In one specific embodiment of the present invention the beam delivery system is associated with a robot which comprises a robot base, a shoulder joint mechanism, a wrist joint mechanism, an elbow joint mechanism and a linkage mechanism for suspending the wrist joint mechanism from the shoulder joint mechanism and the robot base.

The beam delivery system of the present invention comprises a universal or spherical shoulder joint which is mounted close to the vertical axis of the robot shoulder joint and below the articulated arm mechanism of the robot. The wrist joint of the beam delivery system is associated with the wrist joint of the robot. This arrangement permits the telescoping tube set to be rotated horizontally and vertically for accessing a maximum volume beneath the articulated arm mechanism of the robot.

The flexible beam delivery system can be readily adapted to a number of different robots to obtain the benefits of programming flexibility inherent in robots. The beam delivery system of the present invention is not a complicated, one shot system designed and constructed only for special parts.

Because the universal or spherical shoulder joint of the beam delivery system is held in a fixed position and the telescoping tube set of the beam delivery system transmits the beam to the wrist joint in a straight line from the shoulder joint, the entire beam delivery system can be repositioned with a minimum of uncontrolled or delayed inertial forces of the telescoping tubes. Therefore, the beam delivery system essentially controls the position of the tube sets so that the tubes are not affected by inertial forces.

The shoulder joint has two, rotatable, internal mirrors which are in close proximity and which are precision mounted so that the shoulder joint closely approximates a spherical joint in optical performance.

Each rotatable mirror in the shoulder joint is mounted within a housing which is in turn mounted for rotation within bearings which are located on the outside of and at opposite ends of the housing and which are widely spaced apart to minimize any misalignment of the mirrors that could result from inaccuracies or imperfections in the bearings. The bearings are also preloaded to take up any slack. This further reduces mirror misalignment which could result from slack in the bearings.

The wrist joint has two or three internal mirrors, depending upon orientation requirements, and these mirrors are in close proximity to each other so that the wrist joint also closely approximates a spherical joint in optical performance.

Each of the mirrors in both shoulder and wrist joint is positioned from the front surface of the mirror and the mounting points may be in the form of adjustable cams if mirror adjustment is required. The backside of each mirror is in close contact with a liquid cooled or convection cooled spring-biased pressure plate which presses the mirror against its mounting points with a constant force. The pressure plate may be retracted for easy replacement of the mirror which can be accomplished without realignment.

The precision positioning of the mirrors in the shoulder joint and in the wrist joint in combination with the long throw or extended joint provided by the telescoping tubes enable the entire beam delivery system of the present invention to look like one straight continuous cylindrical tunnel to the laser. Each mirror is mounted in the beam delivery system so the beam passes through without approaching a wall at any point closer than it does at any other point.

In accordance with another feature of the present invention, an AC magnetic clamp is attachable to the wrist joint for holding objects to be spot welded from one side only and without introducing any residual magnetism in the parts after the weld has been completed.

Laser beam delivery apparatus and methods which incorporate the constructions and methods described above and which are effective to function as described above constitute further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

In FIG. 1 the beam delivery system is shown associated with a robot for use on an automobile assembly line.

FIGS. 4, 5 and 6 are views of a universal or spherical shoulder joint used in the beam delivery system shown in FIG. 1. The spherical shoulder joint shown in FIGS. 4, 5 and 6 uses only two, rotatable, internal mirrors.

Portions of FIGS. 5 and 6 have been broken away to show details of construction.

The chain dashed outlines shown in FIGS. 4 and 6 show how the structures illustrated can be rotated to the positions indicated.

FIGS. 7, 8 and 9 are views of the wrist joint of the beam delivery system shown in FIG. 1.

Parts of FIGS. 8 and 9 have been broken away to show details of construction.

The chain dashed outlines in FIGS. 7, 8 and 9 show how the parts illustrated can be rotated to the positions indicated.

FIGS. 12, 13 and 14 show another embodiment of a spherical shoulder joint of the beam delivery system of the present invention. The embodiment of the spherical shoulder joint shown in FIGS. 12, 13 and 14 uses three internal mirrors, one fixed mirror and two rotatable mirrors.

Portions of FIGS. 12 and 13 have been partly broken away to show details of construction.

The chain dashed outlines in FIGS. 12 and 14 show the positions to which the parts indicated can be rotated.

FIGS. 15 through 18 are views illustrating details of the adjustable, liquid cooled mirror mounts for the shoulder joint 47.

DETAILED DESCRIPTION OF THE PREFERRED EMBODIMENTS

Figure 1:
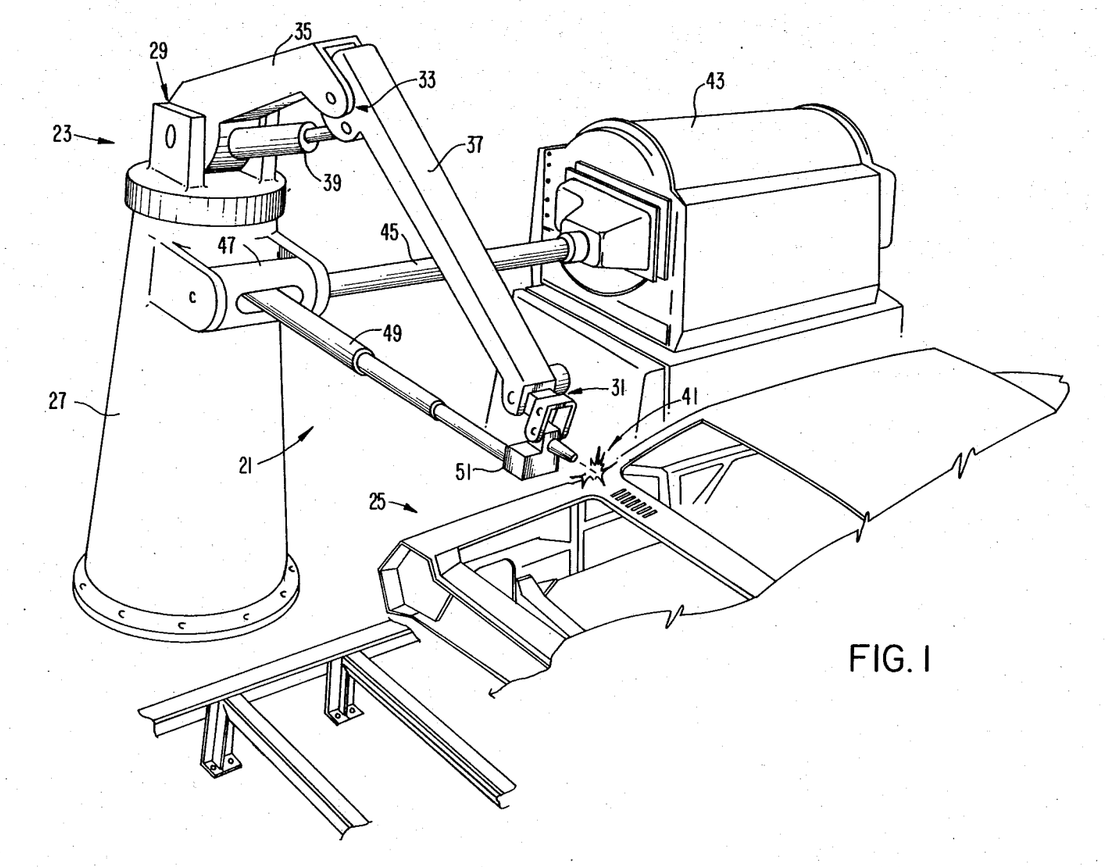
FIG 1 is an isometric view showing a beam delivery system constructed in accordance with one embodiment of the invention.

A beam delivery system constructed in accordance with one embodiment of the present invention is indicated generally by the reference numeral 21 in FIG. 1. In some of the drawing views the beam delivery system 21 is also indicated by the abbreviation "B.D.S.".

The beam delivery system 21 is shown (in FIG. 1) associated with a robot 23 for performing work on an automobile assembly line 25.

The robot 23 comprises a robot base 27, a shoulder joint mechanism 29, a wrist joint mechanism 31, an elbow joint mechanism 33, and a linkage mechanism 35, 37 and 39 for suspending the wrist joint mechanism from the shoulder joint mechanism 29 and the base 27.

In FIG. 1 the robot 23 and the beam delivery system 21 are shown performing a welding operation 41 at a point in space under the robot control.

As will become more apparent from the description to follow, the present invention permits this point in space (or any other point in space) to be achieved by the beam delivery system 21 in accordance with a spherical coordinate system where a point in three dimensions is specified by two angles and a radius. The beam delivery system of the present invention permits a high power laser beam to be conducted through a sealed beam delivery system which basically comprises three subsystems—a spherical joint which is free to rotate in any direction, a subsystem of telescoping, sealed tubes which has a minimum and maximum range, and a wrist joint which allows the beam at the end of the beam delivery system to be pointed in the required direction.

Referring still to FIG. 1, a high powered laser 43, for example, a $CO_2$ laser, is mounted adjacent to the base 27 and is connected to the beam delivery system by a sealed tube 45.

The beam delivery system 21 shown in FIG. 1 includes a spherical shoulder joint 47, a set of sealed, telescoping tubes 49, and a wrist joint 51.

As illustrated in FIG. 1, the shoulder joint 47 is supported from the robot base 27 and the wrist joint 51 is suspended from the wrist joint mechanism 31 of the robot.

In the beam delivery system 21 shown in FIG. 1 one end of the telescoping tube set 49 is controlled at the spherical shoulder joint 47 and the other end of the telescoping tube set 49 is controlled at the wrist joint 51 so that the entire beam delivery system 21 can be repositioned with a minimum of delayed, inertial forces. The system 21 essentially controls the position of the tubes 49 so that the tubes are not affected by inertial forces. This is achieved through control of the joints at both ends of the single set of tubes, the stiffness of the tubes themselves, and by the very compact constructions of the spherical joint 47 and the wrist joint 51.

The beam delivery system 21 of the present invention thus has marked advantages over prior art systems in which the beam delivery systems were mounted on each joint of the robot, because such prior art systems introduced problems of uncontrolled accelerations and delays produced by intermediate joints in the tube sets and also because such prior art articulated tube set constructions were not very flexible if it were necessary to change robots or to change beam delivery systems.

The present invention also has advantages over such prior art articulated tube systems because the beam delivery system of the present invention requires fewer mirrors than the prior art systems. With fewer mirrors there is a small degree of loss of light energy, as will become more apparent from the description to follow.

There is a further advantage resulting from the way that the beam delivery system 21 of the present invention is mounted with respect to the robot 23.

By mounting the spherical joint 47 at the base of the robot 27, and below the two major arms 35 and 37 of the robot, the beam delivery system 21 can be rotated in both horizontal directions and also up and down with a maximum of accessible volume.

The beam delivery system of the present invention is therefore a flexible beam delivery system which can be readily adapted to a number of robots to obtain the benefits of programming flexibility inherent in robots. The beam delivery system of the present invention is not a complicated, one shot system designed and constructed only for special jobs.

Figures 2, 3:
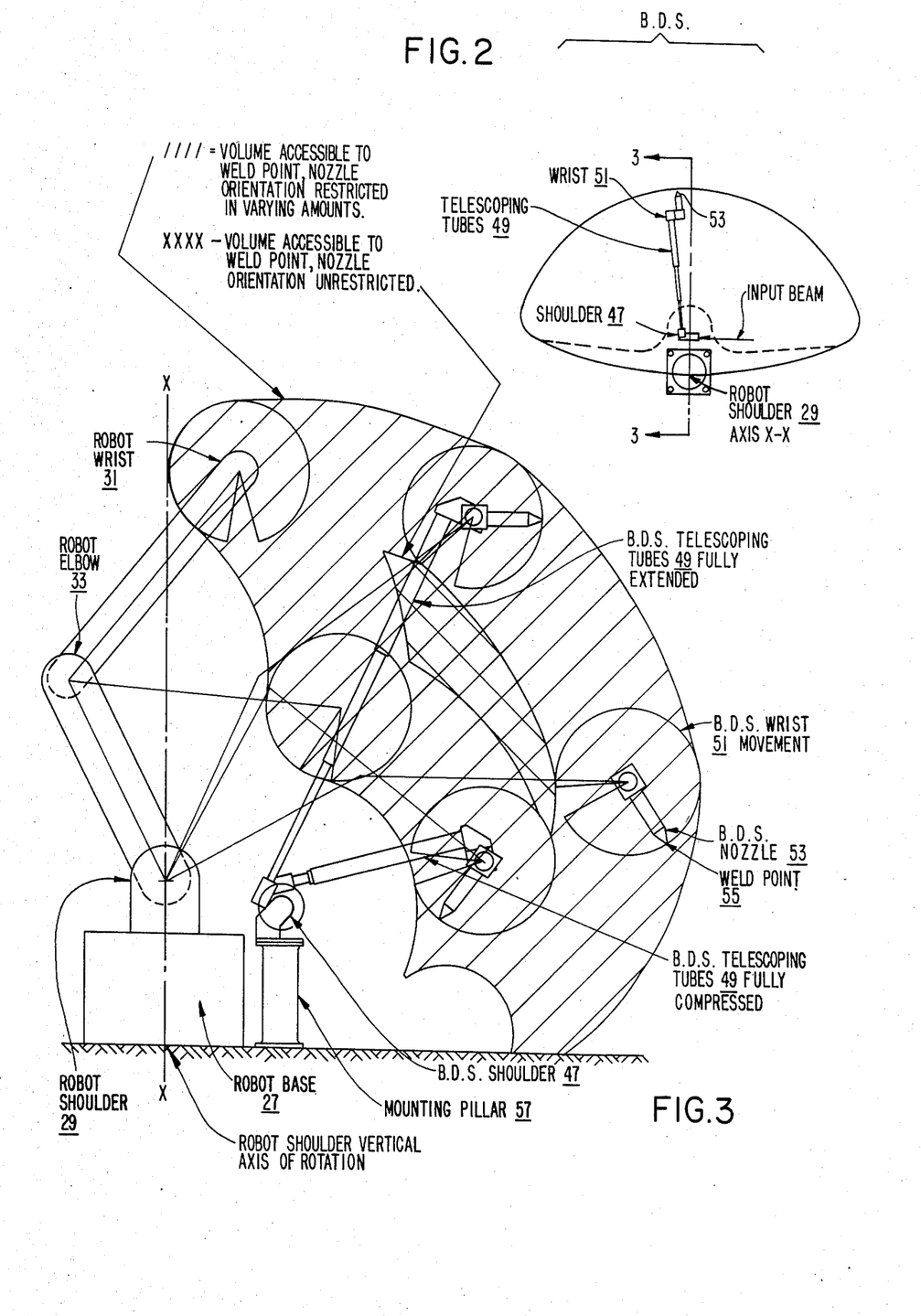
FIG. 2 is a top plan view showing the extent to which the beam delivery system of FIG. 1 can be moved in a horizontal direction.
FIG. 3 is an elevation view, taken generally along the line and in the direction indicated by the arrows 3—3 in FIG. 2, showing the extent of vertical movement of the beam delivery system shown in FIG. 1. The part of FIG. 3 which is cross hatched with single lines indicates the volume which is accessible to the nozzle of the beam delivery system when the nozzle orientation is restricted in varying amounts. The part of FIG. 3 which is cross hatched by double lines indicates the volume inaccessible to the nozzle of the beam delivery system when the nozzle orientation is unrestricted.

The beam delivery system 21 shown in FIGS. 1, 2 and 3 has a nozzle 53 for focusing the beam at a weld point 55.

In FIG. 3 the beam delivery system (B.D.S.) 11 is shown as mounted on a mounting pillar 57 which is located quite close to the vertical axis XX of rotation of the robot (rather than being mounted directly on the base 27 of the robot as shown in FIG. 1).

Figures 4, 5, 6:
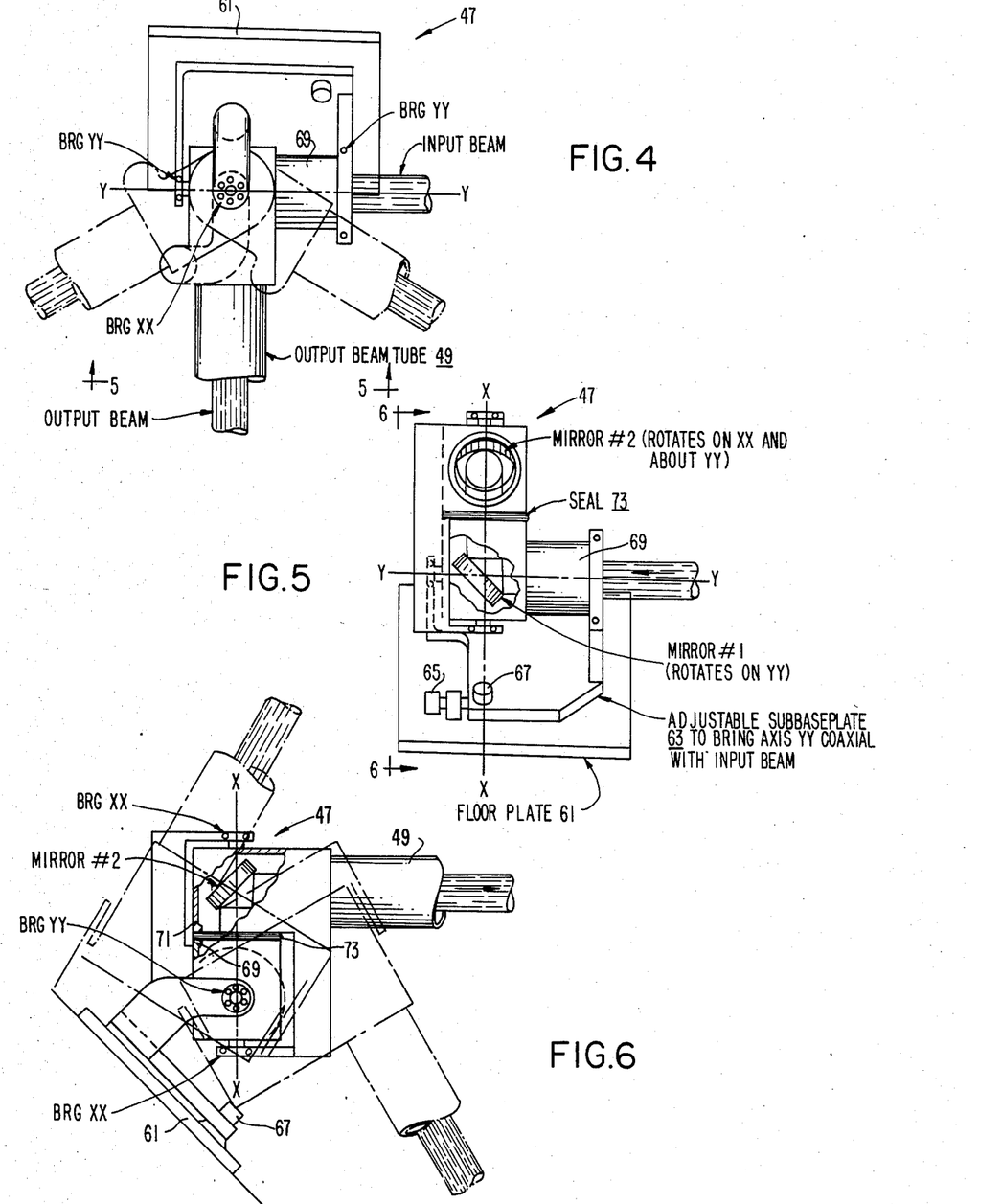
FIG. 4 is a top plan view of the shoulder joint.
FIG. 5 is an end elevation view taken generally along the line and in the direction indicated by the arrows 513 5 in FIG. 4.
FIG. 6 is a side elevation view taken generally along the line and in the direction indicated by the arrows 6—6 in FIG. 5.

FIGS. 4, 5 and 6 show details of construction of one embodiment of the spherical shoulder joint 47.

This embodiment of the shoulder joint 47 is mounted on the mounting pillar 57 (see FIG. 3) by a floor plate 61.

An adjustable subplate 63 is mounted on the floor plate 61 and has adjustment screws 65 and 67 for bringing the axis YY coaxial with the input beam.

Mirror number 1 of the shoulder joint is mounted within a housing 69.

Mirror number 2 in the shoulder joint is mounted within a housing 71.

A seal 73 keeps outside air from entering the housings 69 and 71 and permits relative movement between the housings.

As best shown in FIG. 5, the housing 69 is mounted for rotation with respect to the sub-base plate 63 by bearings YY disposed on the outside of the housing and on opposite ends of the housing. The bearings YY are widely spaced apart by being on the outside of the housing and on opposite ends of the housing, and this minimizes any misalignment of the mirror number 1 which could result from inaccuracies or imprecisions in the bearings YY. This mounting of the bearings achieves high accuracy without the high cost of a large, special, expensive bearing and permits relatively small and inexpensive bearings to be used in the beam delivery system of the present invention.

As will also be described in greater detail below, the telescoping tubes 49 also serve as a variable radius arm which gives tremendous leverage by having a long distance between the mirrors in the shoulder joint 47 and the mirrors in the wrist joint 51.

In accordance with the present invention, a preload is also exerted on the bearings YY at each end of the housing 69 to take up any loose motion that might otherwise be present in the bearings and to further reduce any misalignment of the mirror number 1 which could result from looseness of the bearings.

Figure 10:
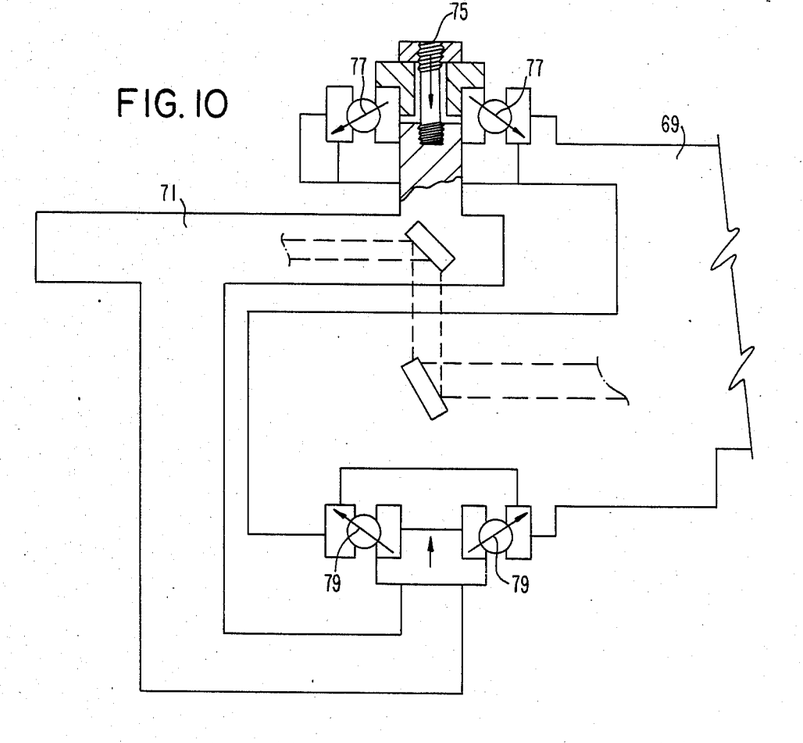
FIG. 10 is a fragmentary, somewhat schematic view showing structural features for preloading bearings in the spherical shoulder joint.

As illustrated in FIG. 10 a screw 75 is associated with the mounting for the bearings YY so that adjustment of the screw 75 exerts a force, in the direction indicated by the arrows 77, on the inner bearing race and through the bearing balls to the outer bearing race to keep all these parts in firm contact. A similar preload force is exerted, in the direction indicated by the arrows 79, on the other bearing YY to preload this bearing in the manner illustrated in FIG. 10.

The bearings XX for the mirror number 2 (see FIG. 6) are also mounted on the outside of the housing 71 and are preloaded in the same way as the bearings YY to minimize any chance of misalignment of the mirror number 2 which could result from inaccuracies or looseness in the bearings XX.

Figure 7:
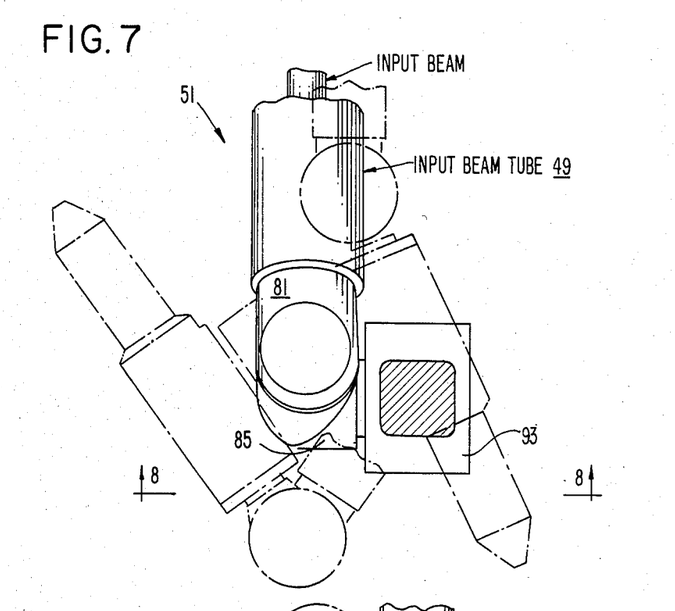
FIG. 7 is a top plan view.
Figure 8:
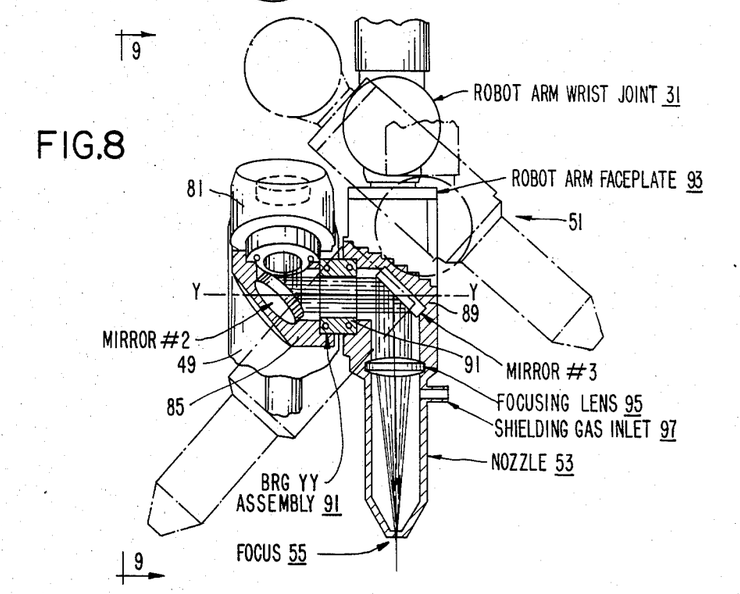
FIG. 8 is an end elevation view taken generally along the line and in the direction indicated by the arrows 8—8 in FIG. 7.
Figure 9:
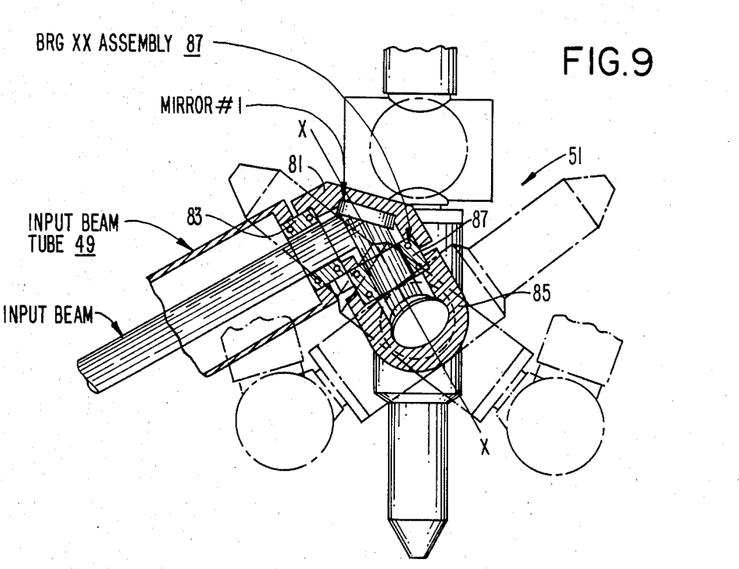
FIG. 9 is a side elevation view taken generally along the line and in the direction indicated by the arrows 9—9 in FIG. 8.

FIGS. 7 through 9 illustrate details of construction of the wrist joint 51.

There are three internal mirrors within the wrist joint 51 and these mirrors are very close coupled. This very close coupling of the mirrors within the wrist joint 51 (in combination with the very long variable length joint provided by the telescoping tubes 49 and in combination with the mounting of the spherical shoulder joint 47 near the center of rotation of the shoulder joint 29 of the robot and below the articulation of the arms 35 and 37 of the robot) gives a very well defined system in space with the beam delivery system of the present invention.

One of the problems in accomplishing a long cast or throw of light energy in the telescoping tubes 49 is to make sure that the mirrors are properly positioned. By providing the close coupling of the mirrors in the shoulder joint 47 this problem is minimized. This problem is further minimized by having all the mirrors in the shoulder joint front mounted by cam adjustments effective to position the mirrors from the front surfaces (and mounted to permit repositioning of the back surface of the mirrors by a spring-biased, liquid-cooled pressure plate), as will be described in more detail below with reference to FIGS. 15-20. The close coupling of the mirrors in the shoulder joint 47 approximates a perfect spherical joint.

Because of the precision of the mirror mountings in the wrist joint 51, the extended joint provided by the telescoping tubes 49 and the close coupling of the mirrors in the shoulder joint 47, the entire beam delivery system 21 of the present invention looks like one straight continuous cylindrical tunnel to the laser 43. Each mirror is mounted in the beam delivery system so that the beam passes through without approaching a wall at any point closer than it does at any other point. The beam delivery system 21 of the present invention, when it is assembled properly, looks like a round tube to the laser 43.

With specific reference to FIGS. 7-8, the wrist joint 51 comprises a housing 81 which mounts the number 1 mirror.

The housing 81 is associated with the input beam tube 49 by a bearing assembly 83.

The number two mirror is mounted within a housing 85, and the housing 85 is associated with the housing 81 by a bearing assembly 87.

The number three mirror is mounted in a housing 89 which is associated with the housing 85 by a bearing assembly 91.

The housing 89 is connected to the robot arm wrist joint 31 by a robot arm faceplate 93.

A focusing lens 95 is mounted within the nozzle 53 for concentrating the output of the laser beam at the focus 55.

A shielding gas inlet 97 is included in the nozzle 53 as illustrated.

Since the laser beam does not exert any mechanical forces on an object being welded or cut, the laser beam can weld and cut without touching.

In some instances, in particular the case of spot welding two pieces of metal together, it is an advantage to be able to hold two objects together by some means other than by mechanically clamping the objects together. A mechanical clamp can be complicated because it has to reach around the parts.

Figure 11:
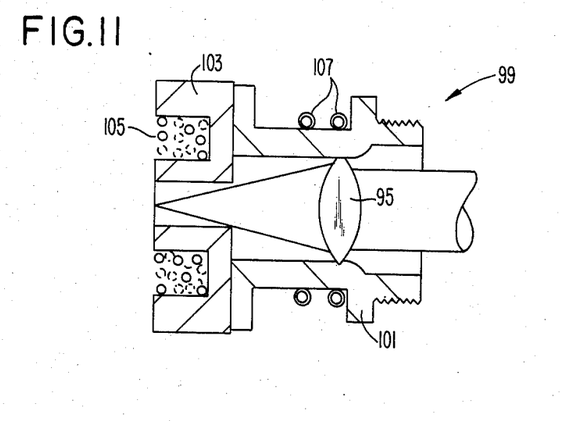
FIG. 11 is a side elevation view, in cross section, showing details of a magnetic clamp used with the wrist joint for clamping parts by magnetic forces, from one side only and in a way that permits the clamped parts to be demagnetized after the work has been performed on the parts.

In one particular embodiment of the present invention a magnetic clamp is used (in place of the nozzle 53 and instead of a mechanical clamp) to eliminate the need to reach around the back side for holding two parts together. This magnetic clamp is illustrated in FIG. 11 and is indicated by the reference numeral 99. The magnetic clamp 99 operates from one side only of the objects being welded. It is an annular shape as shown in the drawings and it is operated with alternating current. By using an alternating current magnet it is possible to get clamping forces that do not permanently magnetize the part. By producing the AC magnetic field over many cycles of the AC current and then by reducing it slowly over several cycles of the AC current, it is possible to bring the material being welded back to zero net residual magnetic field.

The magnetic clamp 99 shown in FIG. 11 includes a part 101 made of nonmagnetic material and having threads at one end for attachment to the wrist joint 51. A soft iron part 103 is attached to the other end of the nonmagnetic part 101, and the part 103 has coils 105 for producing the magnetic field.

Cooling coils 107 circulate cooling water around the part 101 for cooling the lens 95 and also for cooling the part 103 and associated coils 105.

This magnetic clamp 99 produces good spot welds even when there is a little gap between the two parts being welded. The magnetic clamp in association with the laser therefore has advantages over conventional electrical resistance spot welding which requires good contact between the parts being welded.

The mirrors used in the beam delivery system of the present invention are molybdenum mirrors with a backing plate of copper.

As noted above the mirrors are front mounted in the wrist joint 51 by cam adjustments; so it does not matter if a particular mirror was not parallel or if the block behind it was not parallel, because the front surface of the mirror is the surface that does matter—and that front surface is readily and easily positioned during initial setup or calibration (and is also readjustable during operation, if necessary) without realignment of the whole system, which normally is a factory adjustment.

The front surface positioning of the mirrors in the wrist joint 51 is shown in FIGS. 15-20.

Figure 15:
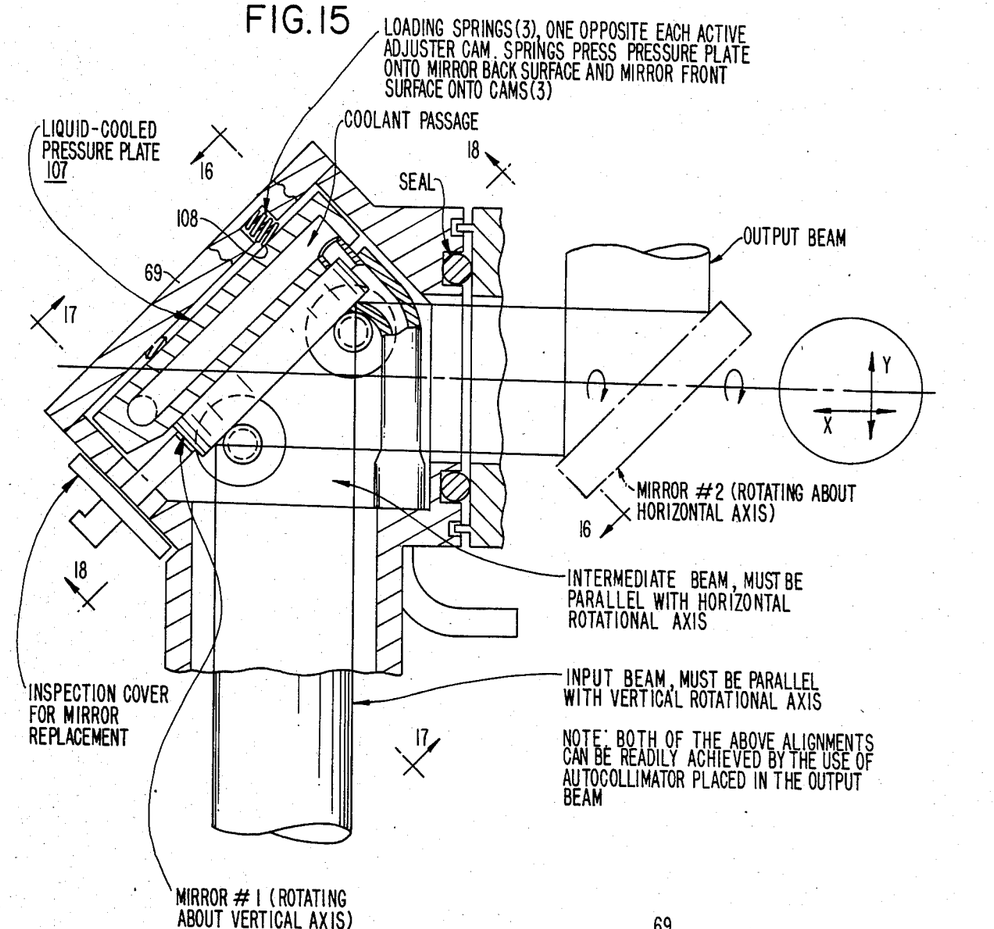
FIG. 15 is an elevation view, in cross section, showing the mounting for the first mirror which receives the input beam from the laser.

As illustrated in FIG. 15 the mirror number 1 in the housing 81 is positioned by three cams which engage the front, reflective surface of the mirror.

Figure 18:
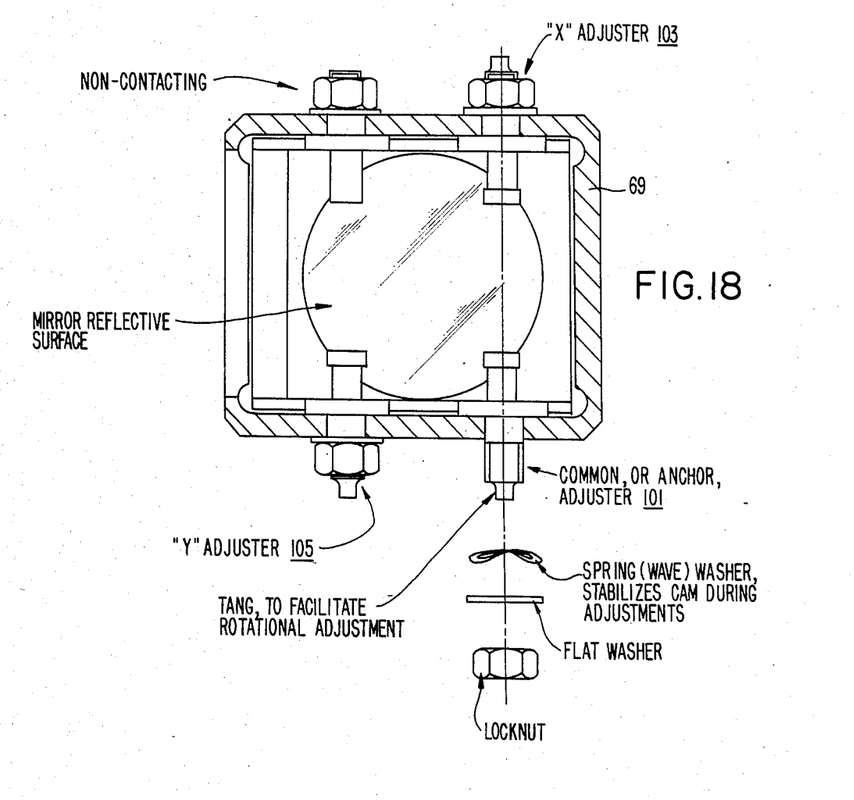
FIG. 18. is a view taken generally along the line and in the direction indicated by the arrows 18—18 in FIG. 15.

As shown in FIG. 18 there are three cams which engage this front surface—a common or anchor adjuster cam 101, an X adjuster cam 103, and a Y adjuster cam 105. These three cams determine the position and angle of the front surface of the mirror number 1.

As illustrated in FIG. 15 a liquid cooled pressure plate 107 engages the back surface of the mirror number 1. Three loading springs 108, one opposite each active adjuster cam, press the pressure plate 107 onto the mirror back surface. This in turn presses the mirror front surface onto the cams 101, 103 and 105.

Figure 16:
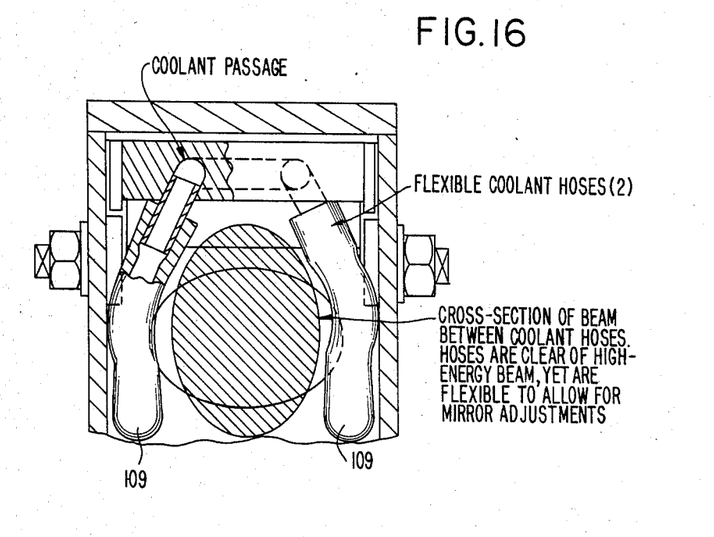
FIG. 16 is a view taken generally along the line and in the direction indicated by the arrows 16—16 in FIG. 15.
Figure 17:
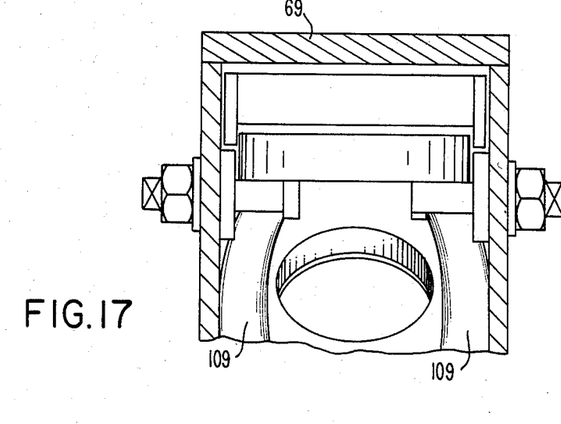
FIG. 17 is a view taken generally along the line and in the direction indicated by the arrows 17—17 in FIG. 15.

As shown in FIG. 16, two flexible coolant hoses 109 conduct coolant through the coolant passages 111 in the pressure plate 107.

The hoses 109 are clear of the high energy beam but are flexible to allow for mirror adjustments.

Figure 19:
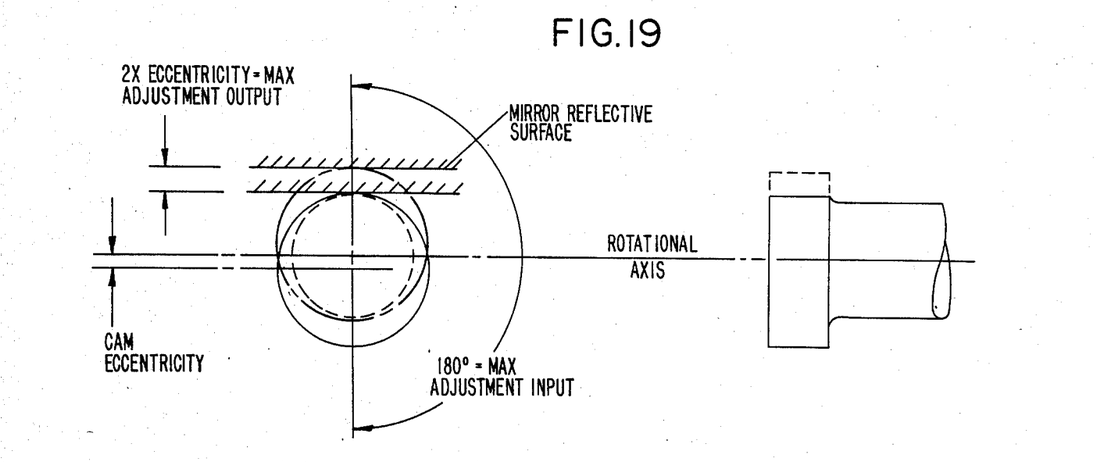
FIG. 19 is a diagrammatic view illustrating how the mirror front surface location is varied with the rotation of the adjustment cam.

FIG. 19 illustrates the range of adjustment of the mirror reflective surface with rotation of a cam.

Figure 20:
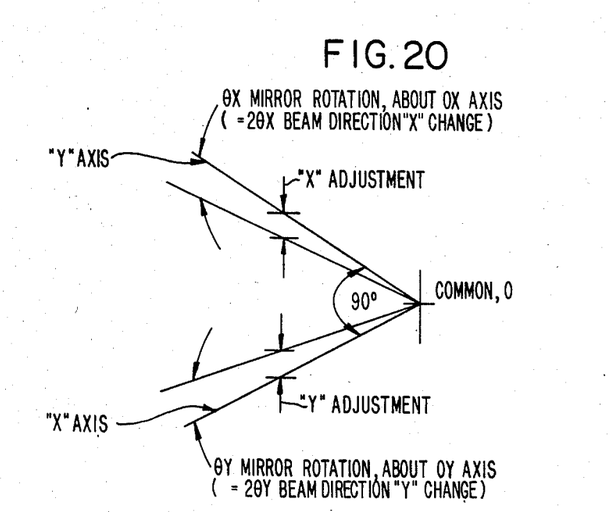
FIG. 20 is a diagrammatic view indicating mirror rotations produced by adjustment of the adjustment cams shown in FIGS. 15-18.

FIG. 20 illustrates mirror rotation in the X and Y directions produced by the cam adjustment mechanism as shown in FIGS. 15-18.

Figure 12:
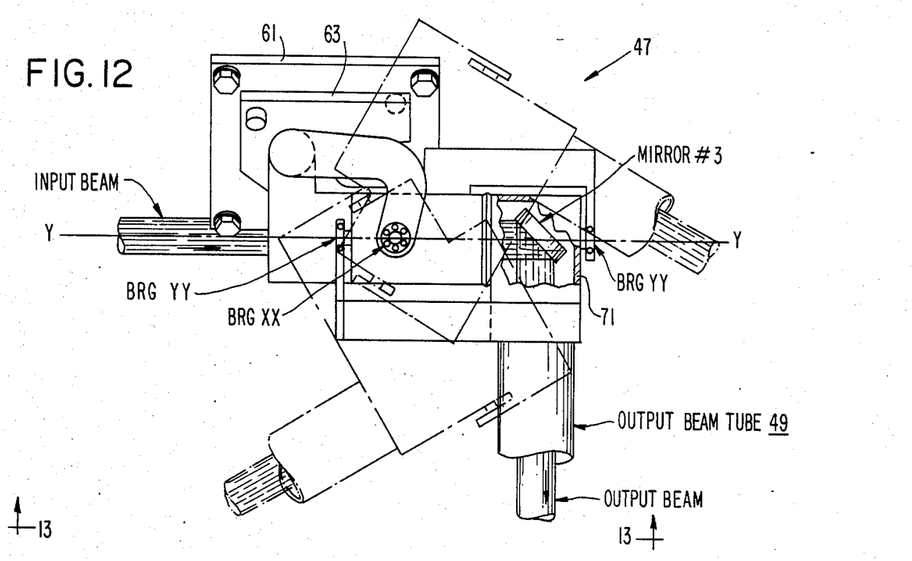
FIG. 12 is a top plan view.
Figure 13:
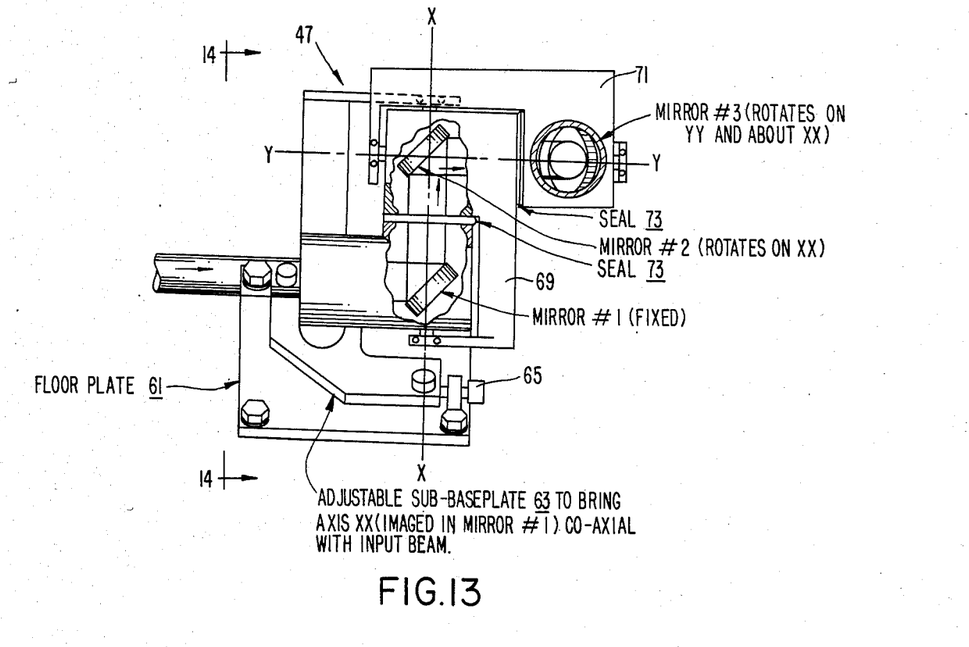
FIG. 13 is an end elevation view taken along the line and in the direction indicated by the arrows 13—13 in FIG. 12.
Figure 14:
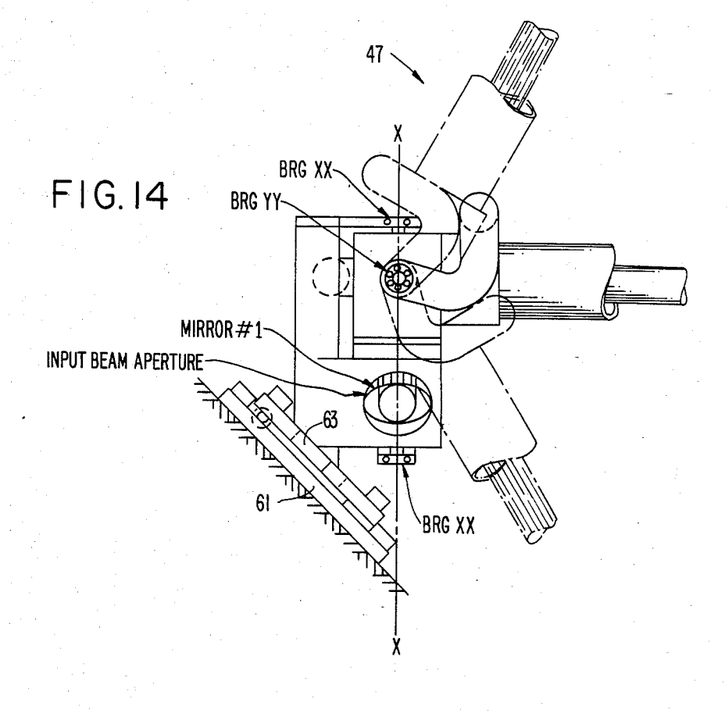
FIG. 14 is a side elevation view taken generally along the line and in the direction indicated by the arrows 14—14 in FIG. 13.

Another embodiment of a spherical shoulder joint constructed in accordance with the present invention is illustrated in FIGS. 12-14. The embodiment shown in FIGS. 12-14 uses three mirrors rather than two mirrors as in the shoulder joint shown in FIGS. 4-6. The parts in the FIGS. 12-14 embodiment which correspond to like parts in the FIGS. 4-6 embodiment are indicated by like reference numerals.

In the FIGS. 12-13 embodiment the mirror number 2 and the mirror number 3 correspond to respective mirrors number 1 and number 2 in the FIGS. 4-6 embodiment.

In the FIGS. 12-14 embodiment mirror number 2 and mirror number 3 rotate on YY and about XX as illustrated, but mirror number 1 is fixed.

The embodiment of the shoulder joint 47 which includes the third, fixed mirror is used when it is convenient to have a fixed mirror, like the mirror number 1, for changing the angle of the laser beam as received from the laser 43 by ninety degrees before transmitting that laser beam to rotatable mirrors in the shoulder joint.

We claim:

1. A beam delivery system for delivering a laser beam from a laser to a point in space under robot control at a work station and wherein the robot is of the kind having a fixed base and an articulated mechanism comprising at least a shoulder joint, a wrist joint and a linkage suspending the wrist joint from the shoulder joint, the beam delivery system being separate from the robot, with a beam path outside of and separated from and having different movements from those of the articluated mechanism, said beam delivery system comprising, shoulder joint means having an inlet for receiving the input beam directly from the laser, an outlet for transmitting the beam to a wrist joint means, two rotatable internal mirrors, and wherein the shoulder joint means include means for redirecting the beam angularly about two orthogonal axes so that the beam at the outlet can be redirected in any angular direction away from the shoulder joint means, limited only by any end limits to arcuate movement in the shoulder joint means, wrist joint means connected to be manipulated by the wrist joint of the robot and having an inlet for receiving the beam as redirected by by the shoulder joint means, an outlet for transmitting the beam to a desired point in space at the work station, and a plurality of internal mirrors, and wherein the wrist joint means include means with up to three mirrors for redirecting the beam angularly in any direction limited only by any end limits to arcuate movement in the wrist joint means, to the work station at the desired point in space, the two mirrors in the shoulder joint means being closely coupled and the internal mirrors in the wrist joint means being closely coupled so that each joint means approximates a spherical optical joint, and telescoping sealed tube means for conducting the beam directly and in a straight line from the outlet of the shoulder joint means to the inlet of the wrist joint means so that the only mirrors in the beam delivery system between the output of the laser and the output of the wrist joint are the mirrors in the shoulder joint means and the wrist joint means, the telescoping sealed tube means including mechanical joint means at each end for permitting it relative motion in accordance with the redirection of the beam at the shoulder joint means and the wrist joint means.

2. The invention defined in claim 1 wherein the shoulder joint means are mounted at the base of the robot close to the vertically extending axis of rotation of the robot and beneath the articulated mechanism of the robot for permitting rotation of the telescoping sealed tube means both horizontally and vertically and for accessing a maximum volume beneath the articulated mechanism of the robot.

3. The invention defined in claim 1 wherein there are only five mirrors in the beam delivery system.

4. The invention defined in claim 1 including a first housing mounting one of the rotatable internal mirrors in the shoulder joint means and a second housing mounting the other of the two rotatable internal mirrors in the shoulder joint means, first and second bearing means mounting the respective first and second housings for rotation within the bearing means, and wherein the bearing means are mounted on the outside of each respective housing and include two sets of roller bearings widely spaced apart from one another so that the mountings of the bearings minimize any effect of inaccuracies in the bearings on the positioning of the associated mirror.

5. The invention defined in claim 4 including preload means for each of the bearing means for taking up any slack in the bearing means and for further minimizing the effect of inaccuracies or looseness in the bearings on accurate positioning of the associated mirror.

6. The invention defined in claim 1 including mirror positioning means for positioning each of the internal mirrors in the wrist joint means from the front surface of the mirrors.

7. The invention defined in claim 6 wherein the mirror positioning means include three movable cams engaged with the front surface of each mirror.

8. The invention defined in claim 7 wherein the mirror positioning means include spring-biased pressure plate means engaged with the back surface of each mirror.

9. The invention defined in claim 8 including coolant means for circulating coolant through coolant passages in the spring-biased pressure plate means.

10. The invention defined in claim 1 wherein the two rotatable internal mirrors in the shoulder joint means are closely coupled and the internal mirrors in the wrist joint means are closely coupled so that each joint means approximates a spherical optical joint, and wherein the shoulder joint means and the wrist joint means are spaced a relatively long distance apart by the telescoping sealed tube means and including mirror positioning means for adjusting the position of each mirror in the shoulder joint means from the front surface of the mirror so that the shoulder joint mirrors are readily and easily positioned both during initial set up and during readjustment or replacement during operation, if necessary, so that the beam delivery system looks like one straight, continuous tunnel so far as the laser is concerned because each mirror is precision mounted to cause the beam to move through the beam delivery system without approaching a wall at any point closer than it does at any other point.

11. The invention defined in claim 1 including magnetic clamp means mounted on the end of the wrist joint means, the beam delivery system including optical means within the clamp means, and wherein said magnetic clamp means comprise a first annular part of nonmagnetic material and a second annular part of soft iron which includes electrical coils for producing a magnetic clamping force by alternating current and wherein the annular part of nonmagnetic material includes cooling coils for circulating cooling fluid to cool both the optical means within the clamp and the soft iron part.

* * * * *